Aug. 9, 1966        L. ERDELY        3,264,869

PROCESS AND APPARATUS FOR STUDYING CURRENTS

Filed Sept. 13, 1963        2 Sheets-Sheet 1

INVENTOR:
LADISLAS ERDELY
BY
Ooms, McDougall & Hersh
ATTORNEYS

INVENTOR.
Ladislas Erdely

United States Patent Office 3,264,869
Patented August 9, 1966

3,264,869
PROCESS AND APPARATUS FOR
STUDYING CURRENTS
Ladislas Erdely, Paris, France, assignor to Pechiney,
Compagnie de Produits Chimiques et Electrometallurgiques, Paris, France
Filed Sept. 13, 1963, Ser. No. 308,854
7 Claims. (Cl. 73—189)

This invention relates to a method and means for studying currents and it is particularly concerned with systems for measuring relative displacements occurring between a fluid and a body immersed therein. The primary utility of the instant invention relates to the measurement of velocity and direction of marine convection currents.

This application is a continuation-in-part of applicant's copending application Serial No. 71,756, dated November 25, 1960, now abandoned.

At present, the measurement of marine convection currents has been conducted by means of mechanisms which comprise an orientation member situated in the current bed whereby rotation of the member is adapted to take place in response to the action of the current. Systems which include propellers or similar devices requiring comparative forces for actuation have been used; however, these devices are only suitable where the intensity of the currents is sufficiently high to overcome numerous mechanical or gravitational inertias characteristic of the measuring structure. It has also been found that measurements taken from conventional devices have often been erroneous due to the fact that foreign materials drifting due to the marine currents have interfered with or blocked moving parts of the system.

One additional difficulty has been recognized with respect to prior existing devices. Such devices are not capable of detecting extremely low intensity current movements in the range of a few centimeters to several meters per hour. Such current movements may involve enormous volumes of water and may have a significant effect with respect to thermal exchanges, climate, ocean fauna, etc.

It is an object of this invention to provide a system for measuring marine currents which is free of the objectionable features noted above.

It is a more particular object of this invention to provide a system capable of measuring relative displacements occurring in the ocean depths even where such displacements are of low intensity and in areas where foreign bodies are present.

These and other objects of this invention will appear hereinafter and, for purposes of illustration but not of limitation, specific embodiments of the invention are shown in the accompanying drawings in which.

Figure 1:
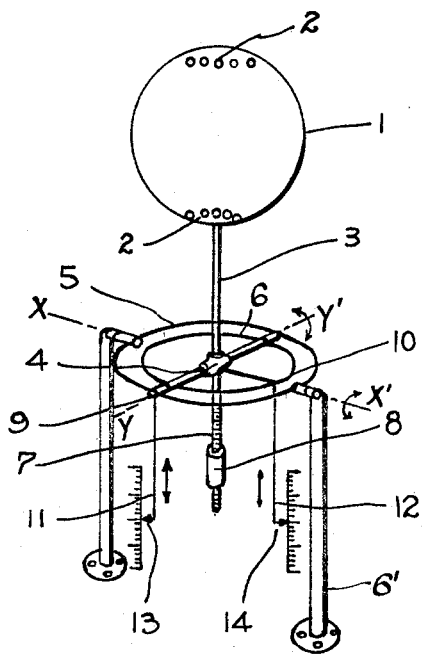
FIGURE 1 is a perspective diagrammatic view of an apparatus embodying the features of this invention for use in the measurement of convection marine currents.

The concepts of this invention present particular advantages when it is desired to measure currents in normally inaccessible places such as the ocean depths. The systems of this invention are also uniquely suitable where it is desired to have immediate information regarding the measurements since these systems can transmit results to a recording or control station while the instruments are submerged in the water.

The apparatus of this invention is designed for the measurement of small or large relative displacements between a fluid and the apparatus submerged in the water. As will be noted hereinafter, the apparatus of this invention comprises a current meter type for detection and determination of the convection motions whereby the condition of the whole water layer in the vicinity of the apparatus can be recorded.

The concepts of this invention are embodied in measuring, both quantitatively and directionally, the deviation between the equilibrium position taken in a fluid at rest by a body which is free to oscillate in any direction and the equilibrium position taken by the same body when it is subjected to the action of the moving fluid. Since the deviation is a function of the velocity and of the direction of the current acting on the body which is free to oscillate in any direction, the characteristics of the studied current can be derived therefrom after a proper calibration.

In one embodiment of the invention, location is made of the equilibrium positions taken by the freely oscillating body under the conjoint action of the current and gravity by measuring the rectangular or polar coordinates of one point on the body or a point integral therewith. These values are either registered on a recording device or otherwise transmitted by tele-indication means, such for example as an electric, electromagnetic, electronic, etc. means, to an accessible controlling or recording station. One of these arrangements or the other is selected depending upon whether the characteristics of the studied currents are sought to be stated either continuously or intermittently.

According to a preferred embodiment of this invention, though not limited thereto, the apparatus for carrying out the process comprises:

(a) A revolution volume placed on the end of a rod arranged as the prolongation of the axis of revolution of said volume;

(b) Two concentric circles mounted for movement relative one to the other and in relation to their support according to two perpendicular rotation axes which cross the centers of the circles; the rod of the revolution volume passes through the center of these circles and is attached to the axis of the internal circle perpendicularly to the plane of the circle, and (c) Means measuring quantitatively and directionally the deviation between the equilibrium positions of both of the circles when said volume, free to oscillate in any direction, is placed in a fluid at rest, on the one hand, and in the fluid in movement, on the other hand.

According to a special feature of the invention, the body subjected to the action of the current while being free to oscillate in all directions comprises an external revolution surface and is provided with an oscillation point preferably situated on the revolution axis, the latter being vertical or very nearly vertical when the body is immersed in a fluid at rest.

In an apparatus embodying the features of this invention, foreign deposits are much less likely to disrupt the operation of the apparatus. This is due to the fact that the force applied by the current to the exposed body increases in proportion with the increase in surface area of the body. Foreign deposits operate to increase the sensitivity of the body since they tend to enlarge the surface area presented to the current. This feature of the invention is of considerable importance since the possibility of recording an absence of current at a time when an actual current exists is greatly minimized.

The free oscillating body may constitute a float either because it is made of a subsance having a lower density than water or because it is provided in the form of a hollow, closed spherical or revolution body having a weight less than the weight of the volume of water displaced.

When it is contemplated to carry out current measurements in the ocean depths (several thousand meters), it is of advantage to make use of an open revolution body in order to provide for a balance between external and internal pressures while simultaneously permitting removal of foreign bodies.

A preferred embodiment of the invention consists in a spherical hollow body formed of a material having a density greater than one and comprising two diametrically opposed apertures, preferably centered on the diameter, which extends in a vertical direction when the moving outfit is balanced in the absence of current.

Another embodiment consists in building up the body with two degrees of freedom in the form of several identical plane elements, making equal angles between one another and having the same symmetry axis, the oscillation point being situated on the prolongation of said symmetry axis.

According to another feature of the invention, the oscillation point of the body is chosen to be a certain distance from the center of gravity (which may be adjusted by displacement of a balance weight) or from the thrust center of the moving outfit, this distance being reducible correspondingly to increase the sensitivity of the device to the action of weak currents.

In the event that the apparatus for applying the new process is immersed with a known orientation, the two horizontal components which define the position taken by the oscillating body under the effect of the current permit measurement of the current for speed and direction. Usually, when the apparatus is immersed without orientation, it is provided with a compass equipped with a tele-indicating means to enable determination of the true direction of the current.

A concept embodying the features of this invention for the measurement of currents consists in joining the oscillating body by means of a suspension with two concentric rings, called a gimbal mounting, the changes of slope of each circle being transmitted, by conventional means, as by means of a lever or rod system, to two elements in translation motion, the displacements of which can be measured. Use is made advantageously of the displacement of said moving elements to vary the characteristics of two electrical impedances, the measurement of which may be effected on the spot or at a distant point.

It will be understood that a measurement system which would use the variation of other quantities (phototransmission, photo-resistance, etc.) is included within the scope of the invention.

Referring now to the drawings, in the apparatus represented in FIGURE 1, a hollow sphere 1, pierced to provide a number of apertures 2 extending therethrough for the purpose of balancing pressures and eilminating impurities, is mounted on a diametral rod 3. The latter is mounted in the center 4 of a pivoting suspension which allows the sphere and rod freely to oscillate in all directions. The suspension is referred to as a gimbal mounting and comprises two concentrically spaced outer and inner rings 5 and 6, respectively, pivoted about two perpendicularly disposed axes XX' and YY' with the XX' axes being journalled on the stationary supporting frame 6' of the apparatus. The rod 3 has an end portion 7 which extends beyond the center 4. Adjustably mounted on the extension 7 is a balancing weight 8 having a lesser external surface by comparison with the external surface of the sphere 1 and which permits regulation of the sensitivity of the moving outfit by displacement of the center of gravity of the assembly in relation to the pivoting point 4 as the weight 8 is displaced lengthwise along the extension 7. At two points 9 and 10, taken 90° apart on each circle 5 and 6, respectively, there are provided, as by suspension, rods 11 and 12, the straight displacements of which reproduce, in rectangular coordinates, the displacement of the sphere with reference to the frame of the apparatus.

When the apparatus is immersed and maintained motionless in still water, the moving outfit takes an equilibrium position represented by FIGURE 1 as influenced by the sole action of gravity whereby the diametral rods 3–7 are nearly vertical. Ends 13 and 14 of rods 11 and 12 occupy a predetermined position corresponding to that indicated by the absence of current.

If a current occurs, there will be a pressure on the half of sphere 1 which faces the current and a depression on the opposed half, the effect of the current resulting in a force which is a function of the sphere surface and the speed of the current. As a result, the moving outfit will take a new equilibrium position from which the speed of the current and its direction can be calibrated from the positions taken by the indices 13 and 14.

The position of indices 13 and 14 may be recorded even when the apparatus is at the bottom of the sea (as by means of photography, band recording, magnetic recording, etc.). The recording or registration can be carried out either continuously or intermittently in response to an electrical impulse sent from the surface level. In either event, the apparatus should periodically be taken up to the surface for examination of the recordings.

Figure 2:
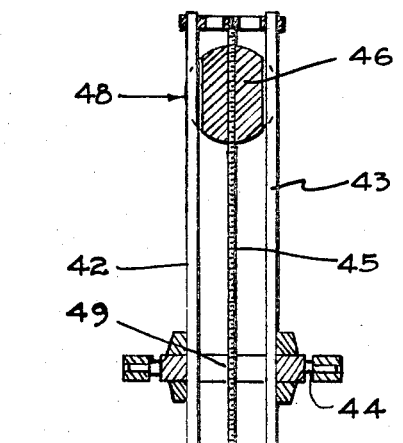
FIGURE 2 is a perspective view similar to that of FIGURE 1 illustrating another embodiment of this invention.
Figure 2:
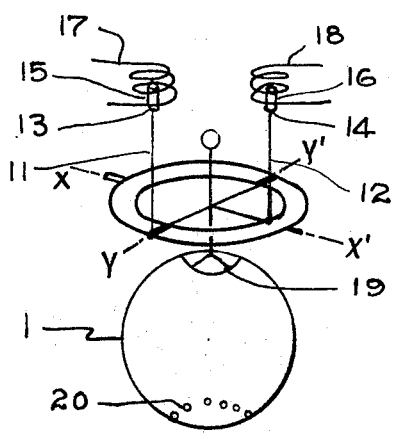

It is often desirable to be able permanently to collect, at the surface level, the information as it is being developed. For this purpose, as illustrated in FIGURE 2, the indices 13 and 14 on rods 11 and 12 are formed with elements 15 and 16 embodying at least in part a magnetic metal. These parts project a variable distance, depending upon the displacements of sphere 1, into coils 17 and 18 to vary the reactance and thereby create frequency variations in a pair of oscillators, the vibrations of which are transmitted by cable to the receiving station at the surface level.

Such an arrangement offers great advantage because, in the absence of current, plungers 15 and 16 are in a mean position in relation to coils 17 and 18. The absence of current is thus construed by an intermediate value on a measurement scale and not by a zero value on that scale thereby to obviate the possibility of arriving at a false conclusion on the absence of current, as when damage occurs in the apparatus.

In the embodiment illustrated in FIGURE 2, the hollow oscillating sphere 1 is provided with large-surfaced, diametrically opposed apertures 19 and 20 which function to prevent the accumulation of foreign bodies within the sphere and which function also to neutralize pressures internally and externally of the sphere.

Frequently, an apparatus embodying the features of this invention is immersed without any orientation whatsoever or even tugged from one place to another in order to achieve current measurement upon extended surfaces. In such instances, the readings of a compass mounted on the apparatus are transmitted to the surface level simultaneously with the positions of plungers 15 and 16.

Figure 3:
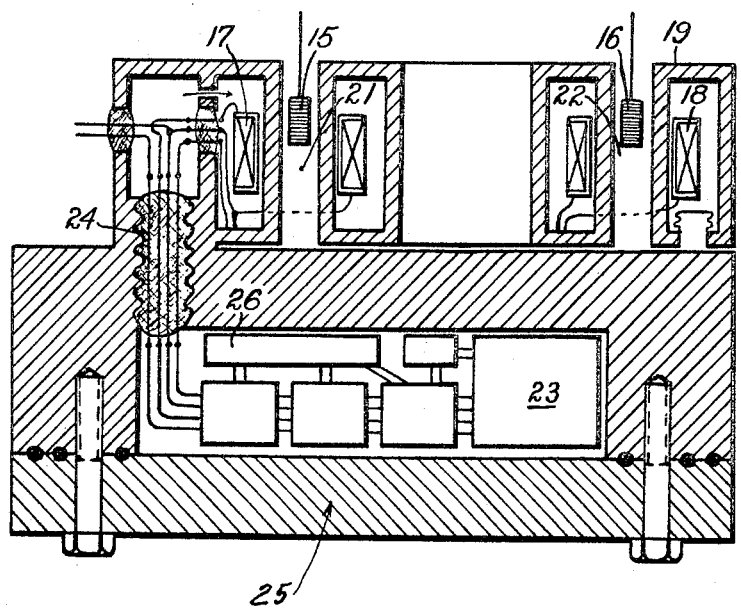
FIGURE 3 is a sectional view which diagrammatically shows the arrangement of the measurement transmission equipment mounted an apparatus embodying the features of this invention.

FIGURE 3 represents an apparatus intended to achieve measurements in the ocean depths. Coils 17 and 18 are housed within a thin casing 19 having substantially no magnetic permeability and which is packed with an incompressible, non-electrically conducting liquid, such for example as a saturated aliphatic hydrocarbon of the type hexane, octane, etc., in order for the enclosure to withstand the pressures encountered in the ocean depths. The plungers 15 and 16, in contact with the water, slide in cylinders 21 and 22 arranged concentrically with the coils.

The transmission equipment is mounted in a fluid tight box 25 which is strong enough to withstand the highest pressures (8000 mm. of water) and constructed of non-magnetic materials to avoid interferences with the operation of compass 23. The electrical connecting wires extend through sealing members 24, as illustrated in several stages in the drawings.

According to a preferred arrangement, the transmission of the three signals to the surface including the two rectangular coordinates of the sphere and the direction indicated by the compass is preferably achieved by means of a unique electrical cable embodying two conductors, the return being eventually effected by the water.

When it is contemplated to carry out current measurements over a long period of time without raising the apparatus to the surface, it is desirable to avoid continuous signal transmission which would rapidly exhaust the feeding battery 26 which is chosen of low capacity in order to avoid increase in the internal volume of the liquid tight box 25. For this purpose, the apparatus is provided with a starting time-switch, definite-time relay which is actuated by an electrical impulse, transmitted from the surface level. According to this arrangement, signals are transmitted for a short period, which is only long enough to enable effectuation of the dial records of current. This further presents the advantage of leaving the electrical cables connecting the apparatus with the ground level available for other measurements such as temperature, salt content, etc. during the greater part of the time.

Figure 4:
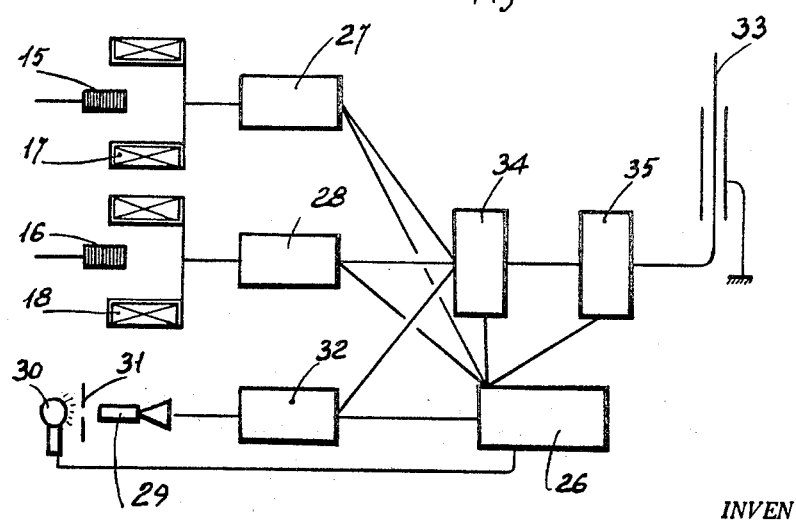
FIGURE 4 is a schematic view including an electrical circuit for transmitting the measurements to the controlling station situated on the surface above the water level; and, FIGURE 5 is an elevational view partly in section illustrating an alternative arrangement for use in the measurement of convection marine currents.

FIGURE 4 represents a diagram of the signal transmitting system housed within the box 25. Coils 17 and 18, the reactance coefficient of which is varied by the displacement of the plungers 15 and 16, are respectively connected with two variable oscillators 27 and 28 having frequency areas which do not overlap.

The indications of the compass are translated, as by means of a photo-electric tube or a photo-diode 29, illuminated by a light source 30, which may be more or less masked by means of a screen 31 integral with the rose compass. The variations of resistance of the photo-diode actuate a variable oscillator 32 set on a third frequency zone. By way of example, it may be said that satisfactory results have been obtained in the following frequency ranges: 100 to 500 periods/second for the first oscillator, 800 to 1300 periods/second for the second oscillator, 1600 to 2200 periods/second for the third oscillator. After they have passed through blender 34, the three waves are transmitted to the surface by means of a conductor 33. At the receiving station on the surface, suitable filters permit separation of the three waves to achieve measurement of the three sets of data which characterize the studied current. In FIGURE 4 there is diagrammatically shown at 35 the starting device for the installation (time-switch, definite-time relay) from the control station on the surface level, this device being energized by means of an electric source situated in the controlling station at the surface level.

A further embodiment of the invention relates to a method and means for measuring both quantitatively and directionally the deviation between the equilibrium position taken in a fluid at rest by a body which is free to oscillate with two degrees of freedom and the equilibrium position taken by the same body when it is subjected to the action of the moving fluid. Specifically, this embodiment provides means for regulating the sensitivity of the apparatus in accordance with strength of the studied current by displacement of the position of the center of gravity of the moving body relative to its oscillation point. This embodiment of the apparatus provides a motor element which permits the adjustment of the position of the balancing weight included therein either from a distance or automatically.

Figure 5:
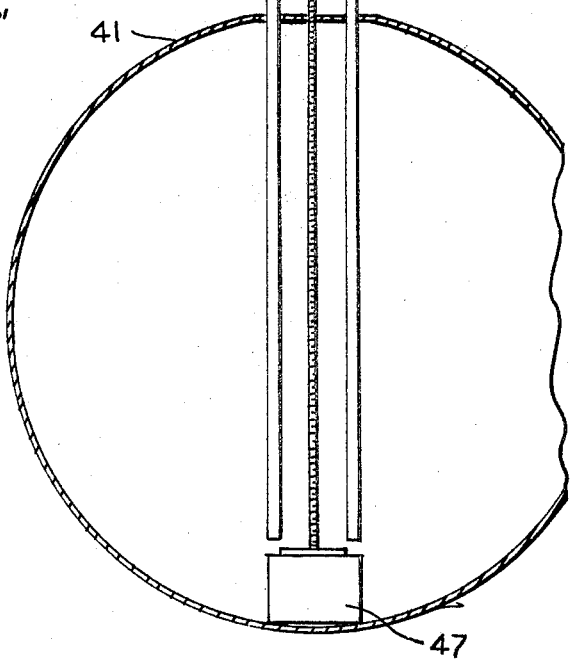

Referring to FIGURE 5, the hollow sphere 41 is mounted on two rigid rods 42 and 43 which are fixed to a gimbal mounting of the type described and of which the interior section 44 is shown. In the plane defined by the rods 42 and 43 and equidistant from them a screw 45 is located. A balancing weight 46 is guided by the rods 42 and 43 and defines a threaded tubular aperture in which the screw 45 is engaged. The screw is set in rotation by a motor-reducer set 47 protected by the hollow sphere 41. When the set 47 is set in operation it displaces the balancing weight lengthwise along the screw.

In the operaiton of the construction shown in FIGURE 5, the weight 46 is disposed at an upper point 48 which is chosen to correspond to the equilibrium position wherein the system is vertically disposed and the center of gravity of the body corresponds to the oscillation point 49. This position is chosen to be the still water position in accordance with normal operation.

Any displacement of the surrounding water will upset the balance of the system and will displace the sphere 41 so that it tilts over to its extreme position (for example, a 90° tilt). The motor 47 is then operated whereby the weight 46 will be displaced along the screw 45. Due to this movement, the assembly will assume an intermediate position between the vertical position and the extreme tilted position. The speed of the current can then be determined by a comparison between the angle assumed by the assembly and the position of the balancing weight. The position of the weight can obviously be determined through the use of timers or means for measuring the number of turns effected by the motor 47 between the starting and stopping positions. Recording of the data can be carried out by means associated with the assembly under the water or the data can be transmitted in any conventional fashion.

It will be appreciated that the operation of the structure shown in FIGURE 5 is dependent upon the moments about the pivot axis. When the assembly is arranged in a vertical position, any force applied by the current to the volume 41 will create a moment causing the aforementioned tilting. The following movement of the weight is therefore at least sufficient to reduce the moment of the weight whereby the moment of the volume will cause the assembly to move back by some measurable amount. The movement of the weight along the rod 45 can then be measured, and this value compared with the angle of the assembly to provide for calculation of the current speed.

Operation of the motor 47 preferably takes place automatically whenever the system is tilted in response to the initial action of the current. Variations in the current which occur thereafter can be calculated since the angle of the assembly will change in response to such variations. Operation of the motor 47 will be undertaken if the current changes cause the assembly to move to the extreme tilted position. The motor can also be operated to vary the intermediate angular positions if desired.

The described process and means is of interest particularly for use in the measurement of convection currents in the vicinity of the ocean depths, for example in such cases where the apparatus rests on the bottom. It will be understood that measurements may be carried out also at intermediate depths without it being necessary to maintain the apparatus under fixed orientation since the compass which is provided with tele-indicating means establishes the true direction of the current.

It will be understood that changes may be made in the details of construction, arrangement and operation without departing from the spirit of the invention, especially as defined in the following claims.

That which is claimed is:

1. Apparatus for the determination of the speed and direction of moving fluids comprising:
   (a) means defining a revolution volume;
   (b) a rod upon which the volume is supported as a prolongation of the revolution axis of said column;
   (c) a pair of concentric rings movable one in relation to the other and in relation to their support about two perpendicular radially extending rotation axes which cross the centers of the rings and in which the rod which passes through the center of the rings is attached to the axis of the internal ring perpendicular to the plane of said ring;

(d) means secured to and extending away from said rings, said means comprising at least two extending rods repsectively attached to said concentric rings and extending perpendicularly to the planes thereof at a point remote from their rotation axes; and (e) means operatively associated with said extending rods for measuring quantitatively and directionally the deviation between the equilibrium positions of both rings when said volume is in a fluid at rest and when the volume is in the same fluid when moving.

2. Apparatus as claimed in claim 1 which includes means for measuring displacements of each of said extending rods.

3. Apparatus as claimed in claim 2 which includes coils and plungers for electrical impedance and means for adjusting said plungers with reference to said coils in response to the displacement of the rod and lever systems to vary the electrical impedance response.

4. Apparatus as claimed in claim 3 in which each impedance is a part of a variable oscillator and which includes means connecting the variable oscillator with control and registration means.

5. Apparatus for the determination of the speed and direction of moving fluids comprising:

(a) means defining a revolution volume;

(b) a pair of concentric rings and support means therefor, said rings being movable in relation to each other and in relation to their support about two perpendicular radially extending axes which cross the centers of the rings;

(c) rod means passing through said rings and operatively connected thereto, said rod means being perpendicularly arranged when said apparatus is disposed in still water and said volume being located in one end of said rod means;

(d) a weight movably mounted at the other end of said rod means;

(e) motor means adapted to move said weight along the length of said rod means;

(f) means secured to and extending away from said rings; and, (g) means operatively associated with said extending means for measuring quantitatively and directionally the deviation resulting in the apparatus due to variations in the speed and direction of the fluids in which the apparatus is immersed.

6. An apparatus in accordance with claim 5 wherein said rod means comprise a central threaded rod located to pass through the axes of said rings and a pair of parallel guide rods fixed to the support for one of said rings, said weight being internally threaded and said motor being adapted to rotate said threaded rod to provide for said movement of said weight.

7. Apparatus for the determination of the speed and direction of moving fluids comprising:

(a) means defining a revolution volume;

(b) a rod upon which the volume is supported as a prolongation of the revolution axis of said volume;

(c) a gimbal mounting for said rod and a support for said mounting, said mounting having concentric portions movable one in relation to the other and in relation to the gimbal support about two perpendicular radially extending rotation axes which cross the centers of said gimbal portions and in which the rod which passes through said gimbal portions is attached to the axes of an internal gimbal portion perpendicular to the plane of said internal portion;

(d) means secured to and extending away from said concentric gimbal portions, said means comprising at least two extending rods respectively attached to said portions and extending perpendicularly to the planes thereof at a point remote form their rotation axes; and (e) means operatively associated with said extending rods for measuring quantitatively and directionally the deviation between the equilibrium positions of both of said portions when said volume is in a fluid at rest and when the volume is in the same fluid when moving.

References Cited by the Examiner

UNITED STATES PATENTS

| | | | |
|---|---|---|---|
| 2,125,365 | 8/1938 | Waller | 73—189 |
| 2,665,583 | 1/1954 | Anjcenos | 73—189 |
| 2,913,900 | 11/1959 | Andrews | 73—189 |
| 3,038,343 | 12/1962 | Deist | 33—206 |

FOREIGN PATENTS 1,839    7/1965    Great Britain.

LOUIS R. PRINCE, *Primary Examiner.*

RICHARD QUEISSER, DAVID SCHONBERG,
*Examiners.*

S. C. SWISHER, *Assistant Examiner.*